Figure 4:
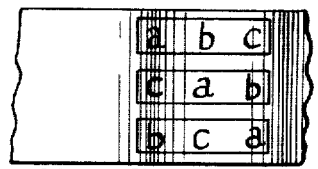

Jan. 18, 1966  C. R. COOKE  3,230,380
PHOTOSENSITIVE POLYPHASE APPARATUS FOR
DETECTING AND INDICATING THE EXTENT
OF RELATIVE MOVEMENT
Filed Feb. 5, 1962  11 Sheets-Sheet 1
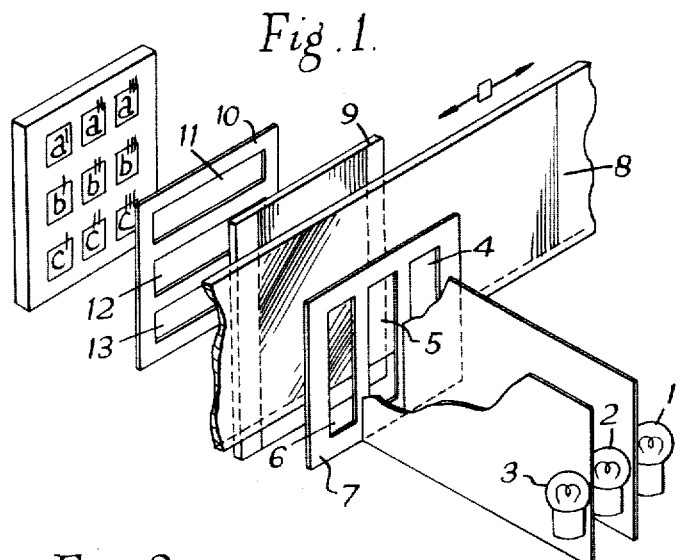
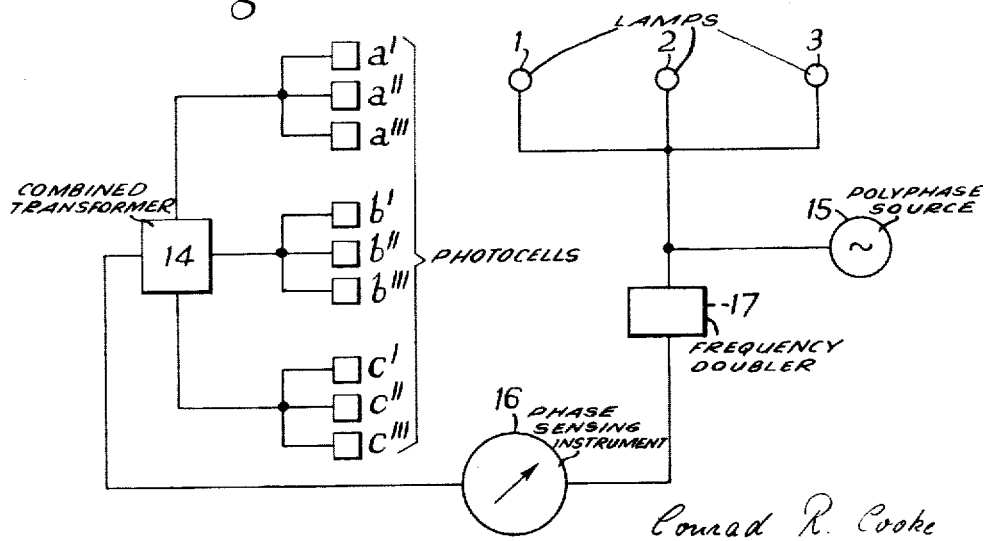
Conrad R. Cooke
INVENTOR
BY Wenderoth, Lind & Ponack
ATTORNEYS Conrad R. Cooke
INVENTOR BY Wenderoth, Lind & Ponack
ATTORNEYS Jan. 18, 1966

C. R. COOKE 3,230,380

PHOTOSENSITIVE POLYPHASE APPARATUS FOR
DETECTING AND INDICATING THE EXTENT
OF RELATIVE MOVEMENT

Filed Feb. 5, 1962

11 Sheets-Sheet 7

INVENTOR,
Conrad R. Cooke
BY Wenderoth, Lind
& Ponack
ATTORNEYS

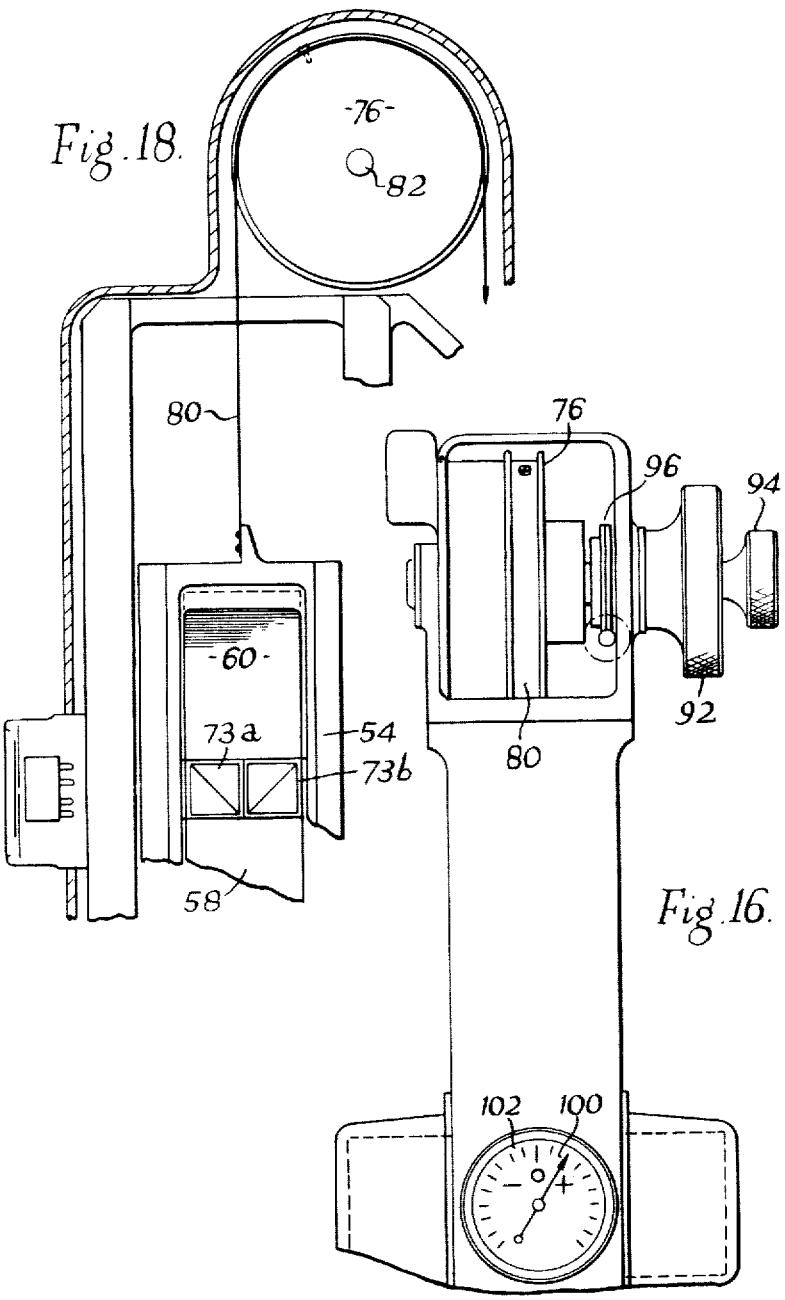

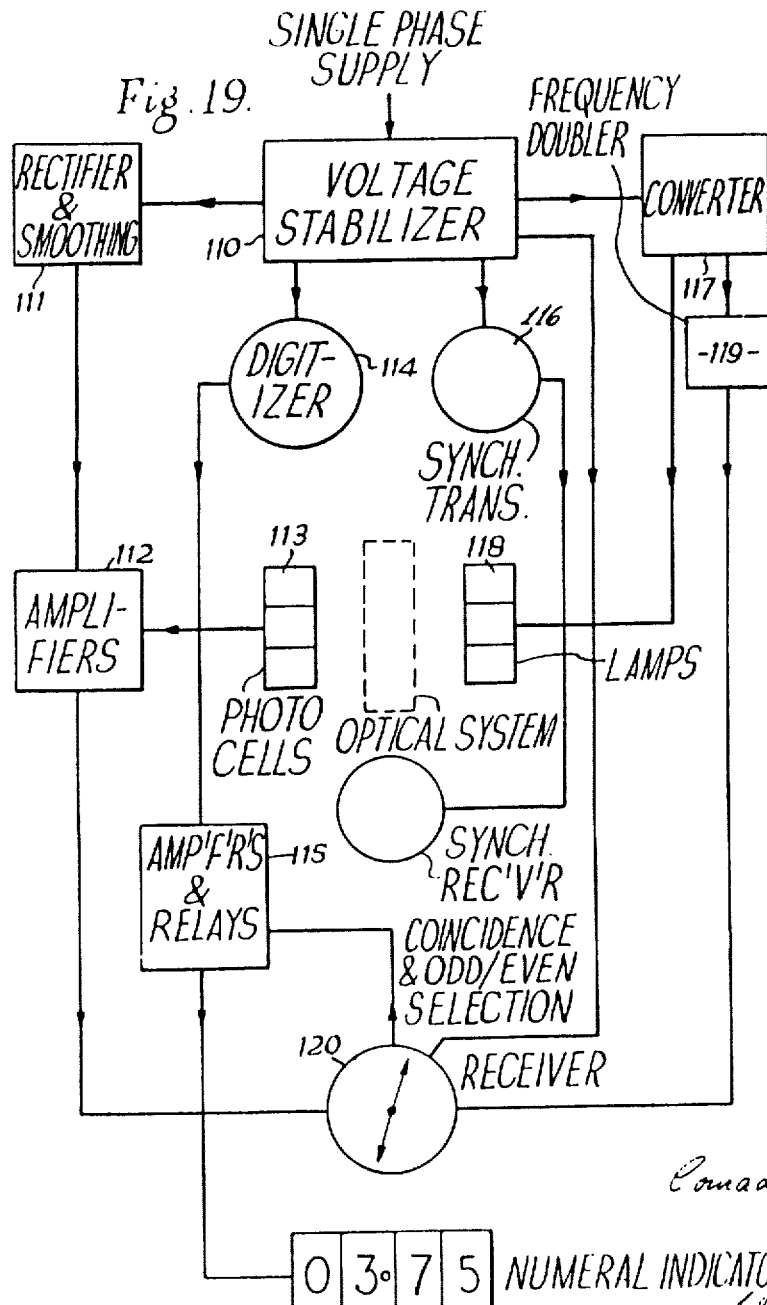

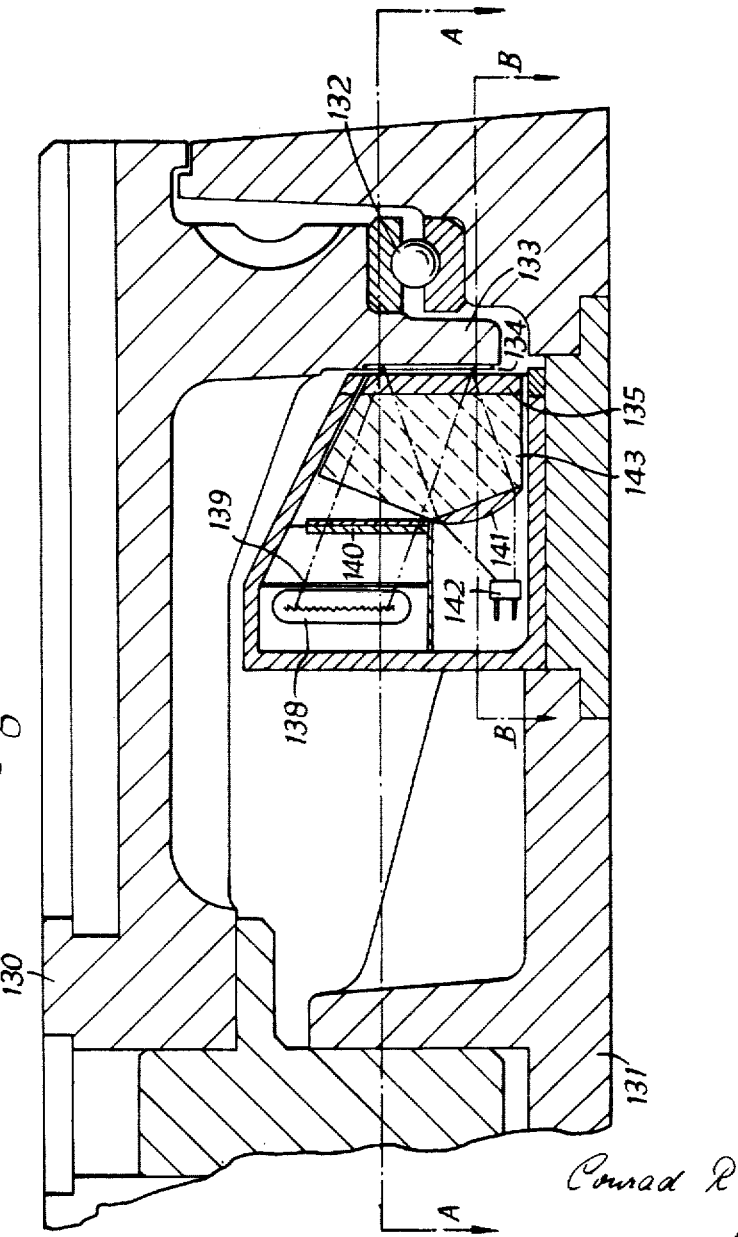

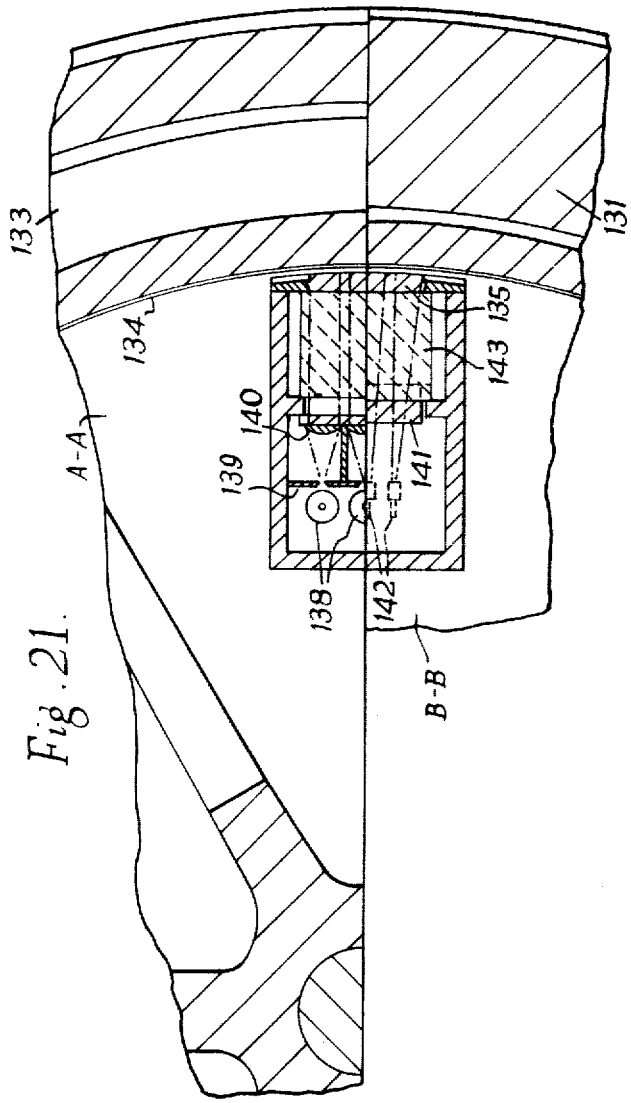

United States Patent Office 3,230,380
Patented Jan. 18, 1966

3,230,380
PHOTOSENSITIVE POLYPHASE APPARATUS FOR DETECTING AND INDICATING THE EXTENT OF RELATIVE MOVEMENT
Conrad Reginald Cooke, 30 Bogstadvn.-Leil. 321, Oslo, Norway
Filed Feb. 5, 1962, Ser. No. 170,976
Claims priority, application Great Britain, Feb. 8, 1961, 4,732/61; Mar. 20, 1961, 10,051/61
16 Claims. (Cl. 250—237)

This invention relates to apparatus for detecting and indicating the extent of relative movement and in particular to apparatus of this kind which is suitable for use in indicating movement to a high order of accuracy.

It is known, for example in relation to the control of machine tools, to produce by the relative movements of gratings or equivalent devices magnified movements of interference fringes of electromagnetic energy, which expression is intended to include light waves, and to count the number of fringes passing a reading head as, for example, a slide of the machine tool is moved. Such methods necessarily involve relatively elaborate counting apparatus and also suffer from the limitation that they are capable of resolving to an accuracy limited to the spacing of the lines in the reference grating used. In a known system a quadrature arrangement of photo cells in a reading head is used by which the resolution may be increased up to four times, but it is still limited by the ruling of the grating. Resolution can be increased by using finer gratings, but very fine gratings are difficult to use reliably. There are great difficulties in working with gratings having much more than 1,000 lines per inch, but even this number still corresponds only to obtaining a resolution of $.001'' \div 4 = .00025''$ using photo cells in quadrature. There are also the difficulties of avoiding ambiguity of readings and of having to count the fringes from some reference point in order to obtain a reading of measurement, unless the complications of introducing a memory system are added.

It is an object of the present invention to provide an improved arrangement which enables relative movement or position to be readily and reliably measured using comparatively coarse and therefore more manageable gratings and to much higher resolution than is possible by any counting methods.

Another object of the invention is to present such movement as a reading on a dial or dials which may be calibrated directly in terms of the units involved.

It is also an object of this invention to translate relative movement into single or polyphase signals of constant amplitude which can operate an indicating device, a servo type of receiver, or a synchronous electric motor, or other such source of control.

According to the present invention, the movement of interference fringes is applied to provide a derived signal the phase of which, relative to the phase of a reference signal, will vary in proportion to the extent of movement of an interference fringe from a predetermined position. The derived signal and reference signal may be applied to an indicating device or servo type receiver whereby to cause the rotor thereof to move through an angular distance which is proportional to the extent of the movement of the interference fringe.

In practicing the invention, the movement of one interference fringe through a distance corresponding to the separation of adjacent fringes may be arranged to produce a phase, i.e. vector, rotation of the derived signal relative to the reference signal of, for example, 360° and if this movement is made to correspond to an actual distance of, say, one-hundredth of an inch, one revolution of the rotor will correspond to such distance, and by arranging that the rotor moves a pointer over a scale divided into one hundred units, readings in tenths of thousandths of an inch can be directly obtained.

The invention thus provides primarily a means for obtaining very high resolution by dividing the interval between successive lines on a reference grating to an extent limited only by the sensitivity of the indicating instrument and the number of divisions which can be accommodated on the dial on which the last digits are expressed. For example, using a 500 lines per inch reference grating and an indicator which has 200 divisions round its dial, a direct reading in units of .00001" is obtained. Even higher resolution may be obtained by using finer gratings and/or more divisions on the dial and/or by phase multiplication.

Figure 3:
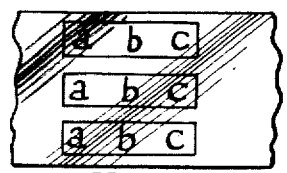
Figure 5:
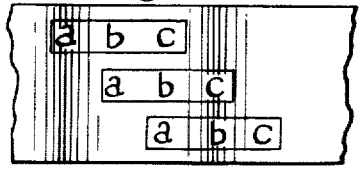
Figure 6:
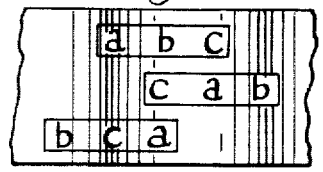
Figure 7:
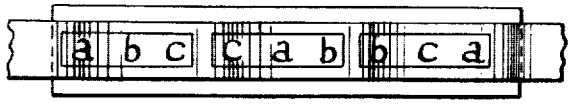
Figure 8:
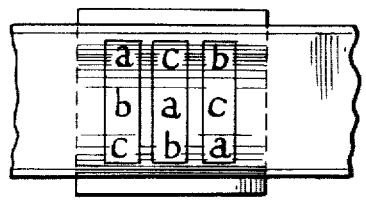
Figure 9:
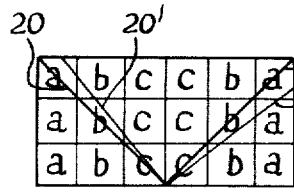
Figure 10:
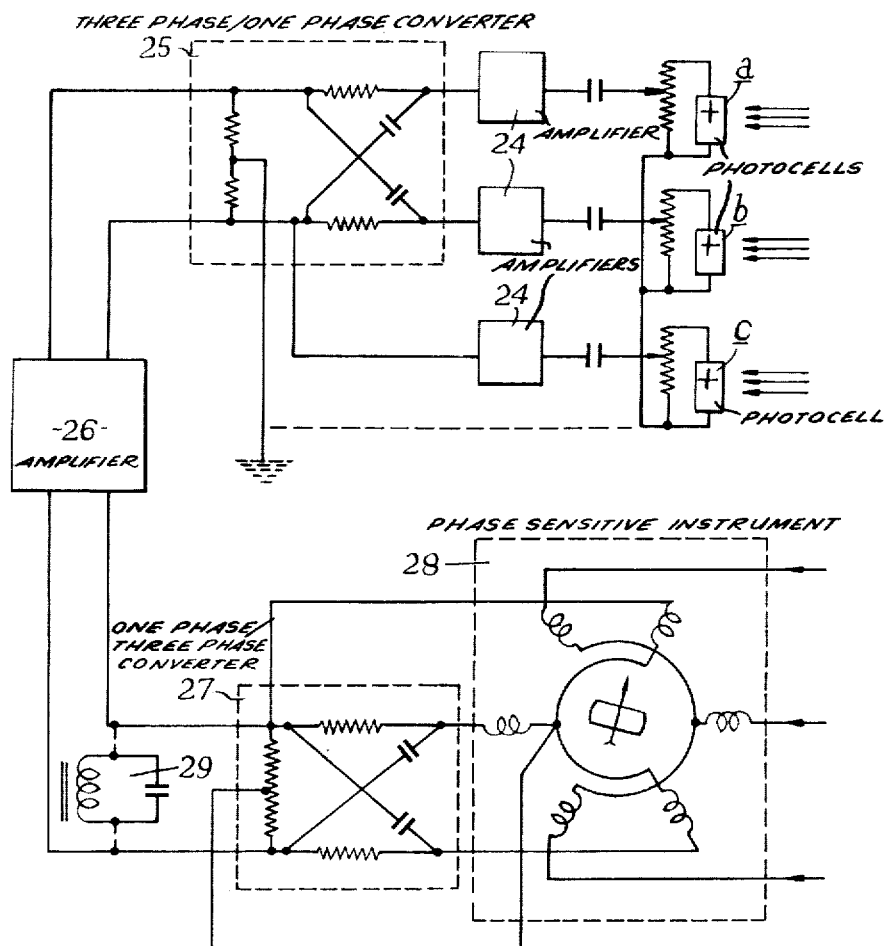
Figure 11:
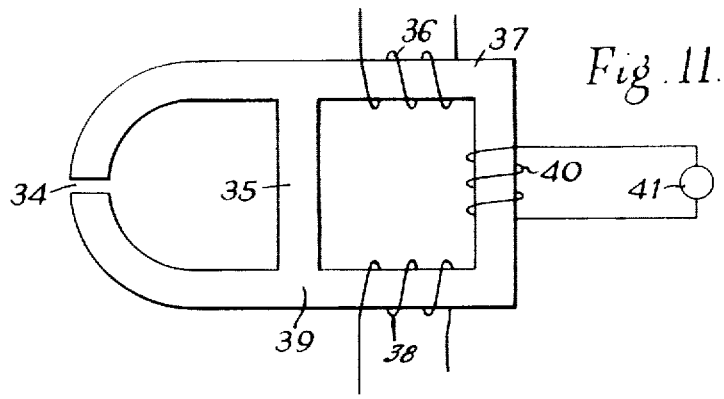
Figure 12:
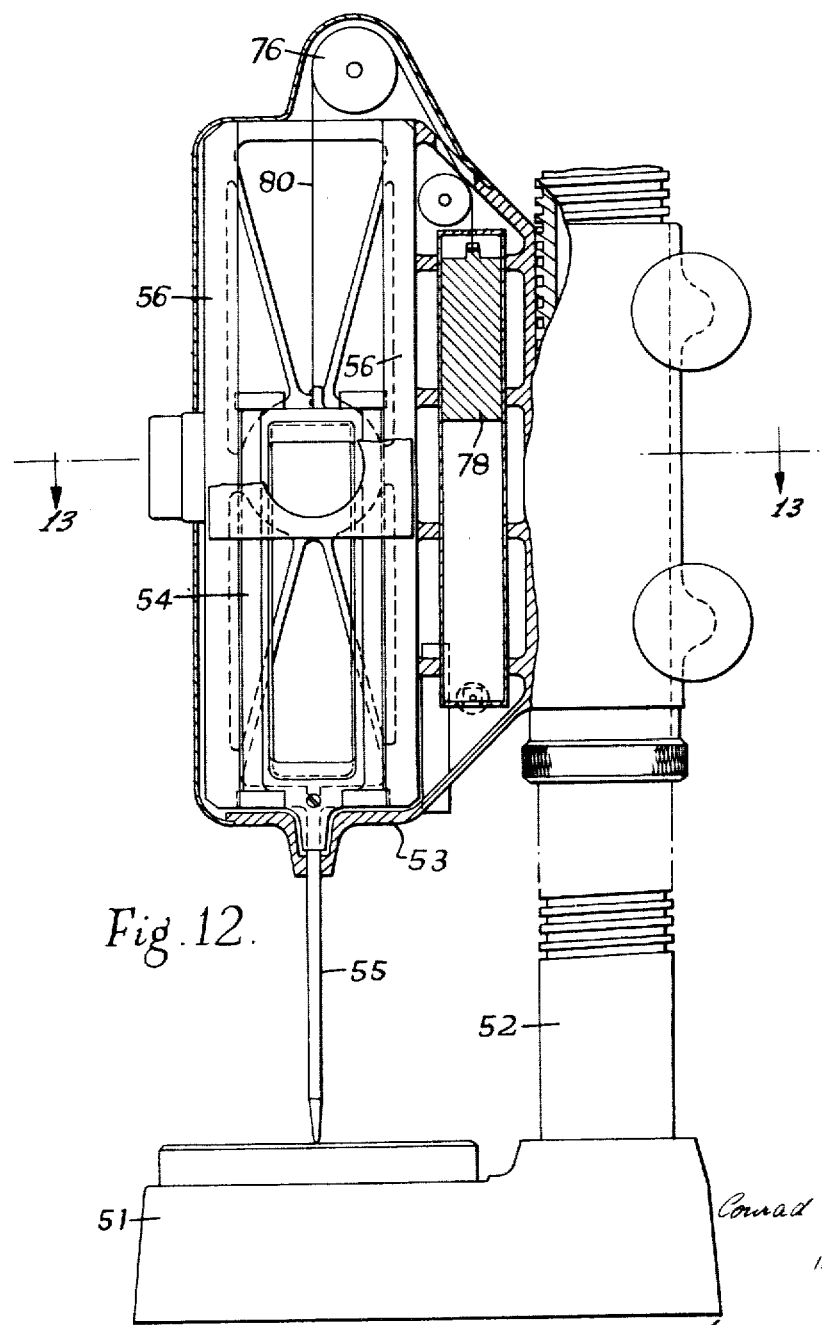
Figure 13:
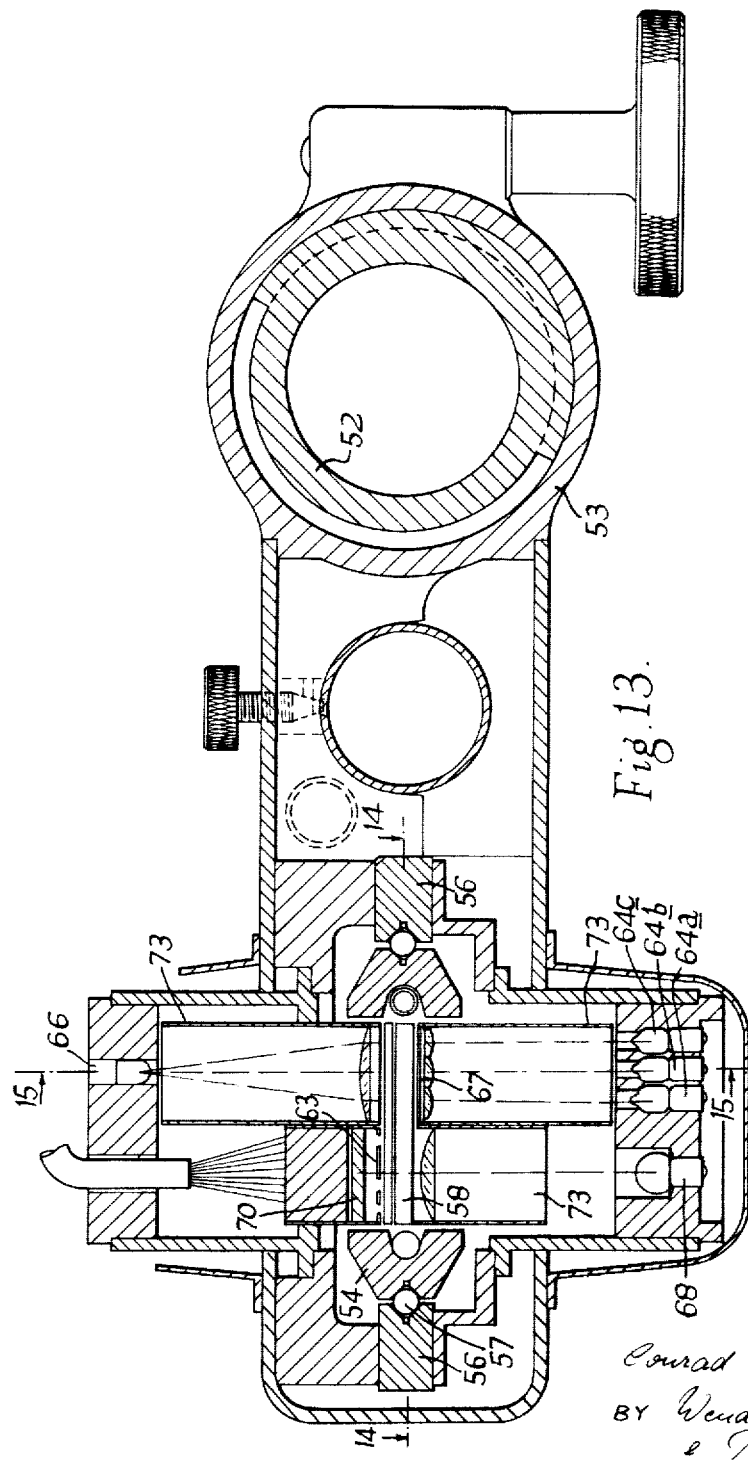
Figure 14:
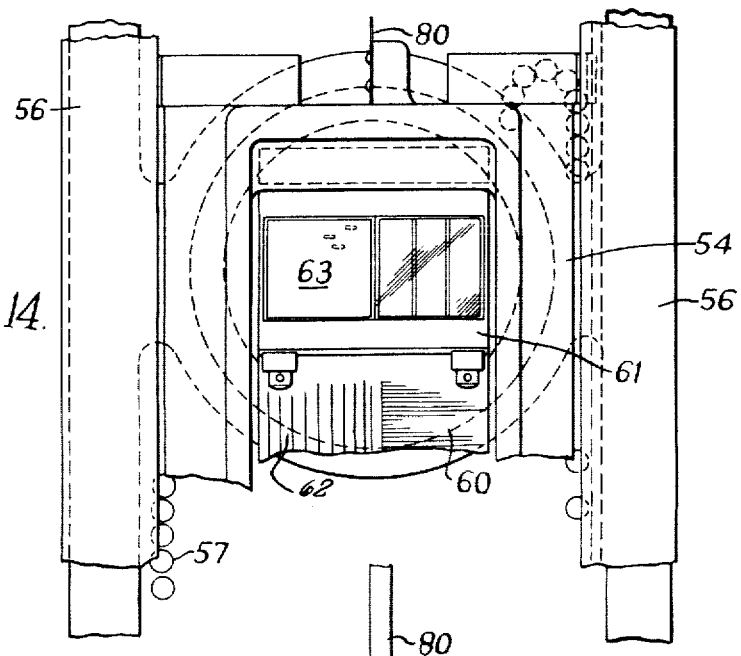
Figure 15:
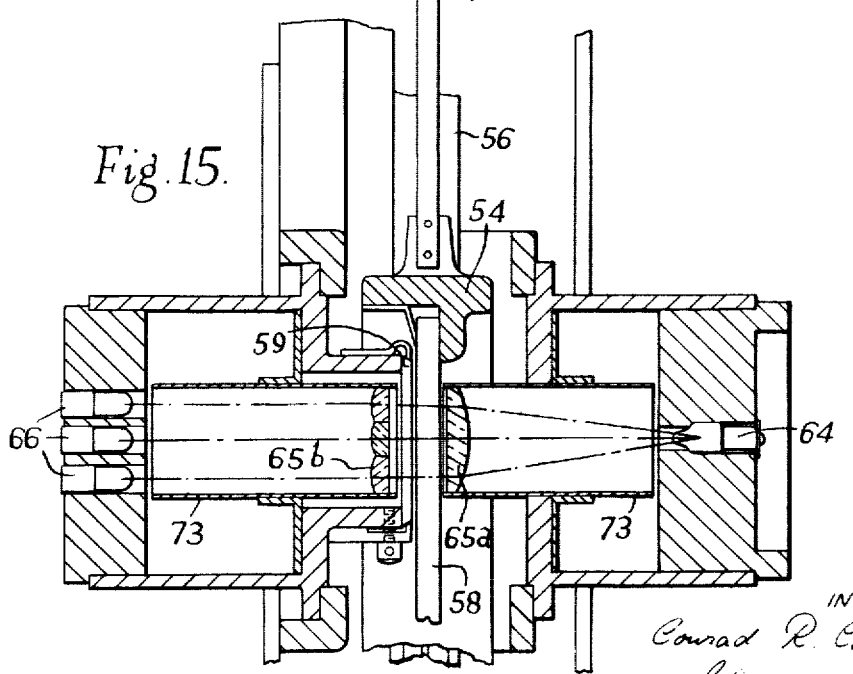

The invention will now be described with reference to the accompanying drawings, in which:

FIGURE 1 is a diagrammatic view showing in perspective the essential component of one form of the invention, FIGURE 2 is a block diagram showing in simplified form the electrical circuit arrangement of the arrangement of FIGURE 1, FIGURES 3 to 8 show various alternative arrangements of the photo cells shown in FIGURE 1, FIGURE 9 shows in diagrammatic form a modification of the arrangement of FIGURE 3, FIGURE 10 is a circuit diagram partly in block form of one form of the system of this invention, FIGURE 11 shows one form of magnetic head for use in conjunction with magnetic gratings, FIGURE 12 is a part sectional elevation of a height gauge, FIGURE 13 is an enlarged section on the line 13—13 of FIGURE 12, FIGURE 14 is a section on the line 14—14 of FIGURE 13, FIGURE 15 is a section on the line 15—15 of FIGURE 13, FIGURE 16 is a fragmentary elevation of a modification of the instrument of FIGURES 12 to 15, FIGURE 17 is a central vertical section of the upper part of the apparatus shown in FIGURE 16, FIGURE 18 is a fragmentary side view of the apparatus shown in FIGURE 16, FIGURE 19 is a block diagram showing the circuit arrangement of the instrument of FIGURES 12 to 15 and 16 to 18, FIGURE 20 is a fragmentary sectional elevation of a dividing head incorporating the invention, and FIGURE 21 is a section partly on the line A—A and partly on the line B—B of FIGURE 20.

In carrying the invention into effect, any form of electromagnetic energy that can be applied to produce interference fringes may be used but for simplicity the invention will be described at first in the form in which light is used. As applied to a machine tool for measuring the movement of a slide thereon, the interference fringes may be produced by the use of a reference grating which may be in the form of a scale and which is fixed to the bed of the machine, and an index grating which is carried by the slide and moves in close proximity to the reference grating. The two gratings may be superimposed and the interference fringes produced by transmitted light. Alternatively the two gratings may be arranged at an angle to one another and the interference fringes produced by reflected light. The latter arrangement is preferred in some cases where in order to avoid difficulties caused by thermal expansion it is required to use gratings made of steel or other metal having a suitable coefficient of expansion.

FIGURE 1 shows diagrammatically a form of the invention in which transmitted light is used and FIGURE 2 shows, in simplified form, the wiring diagram. As shown, three lamps 1, 2 and 3 each operated on a respective phase and suitable for use at the frequency of a three-phase system are arranged to illuminate, with light modulated at the frequency of the system, three elongated slits 4, 5 and 6 formed in mask 7 which extend parallel to one another and transverse to the direction of the movement to be measured. Two superimposed gratings, namely a movable reference grating 8 and a fixed index vernier grating 9 ruled with a slightly different line spacing so as to produce vernier type fringes are arranged behind these slits and in front of a second mask 10 formed with three slits 11, 12 and 13 which extend in the direction of movement of the reference grating 8. Finally, behind the slits 11, 12 and 13 of mask 10 are respective rows of three photo electric cells $a'$, $a''$ and $a'''$, $b'$, $b''$, and $b'''$, and $c'$, $c''$ and $c'''$ which extend in the direction of movement. The two gratings are so arranged that their rulings are relatively inclined at a small angle so that the vernier fringes produced incline diagonally across the pattern of cells. The rulings of the gratings are also such that the spacing between interference fringes just covers one complete row of photo cells, and the inclination is such that as one fringe is just approaching the pattern of cells, for example the cell $a'$ of the first row, the next adjacent fringe on one side is just leaving the cell $c'$ of the third row. The output of the three cells in each row is combined vectorially and the three signals so obtained from the three rows are combined in a three-phase transformer 14 (FIG. 2) to provide a three-phase derived output signal. So long as there is no movement, this three-phase signal will be in synchronism with the three-phase reference signal, that is the supply to the lamps 1, 2 and 3 from source 15, although there may be a lag or lead depending on the position of the fringe on the pattern of cells. However, if the fringe moves there will be a phase rotation of the derived signal relative to the reference signal which may be arranged to amount to 360° as each fringe traverses any one row of cells. The signal and the reference signal are applied to a suitable phase sensing instrument 16, for example to the two three-phase windings of a synchro type receiver, such as a Monodiff, in which the movement of a rotor causes a pointer to move over a scale. With such an instrument there is no movement of the rotor, or the pointer connected therewith, unless there is a phase angle difference between the vectors of the rotating fields set up in the two three-phase windings by the two signals and when this occurs the rotor will so move as to cancel out such difference. Accordingly the position of the pointer will correspond to the position of an interference fringe relative to the pattern of cells and if the spacing between the fringes by suitable design of the rulings of the gratings is made to correspond to a movement of the reference grating 8 of, say, one-hundredth of an inch, one rotation of the pointer of the instrument will correspond to such distance and with the scale divided into one hundred equal divisions, a reading in units of ten-thousandths of an inch is obtained. It will be appreciated that the instrument reading indicates the position of an interference fringe on the pattern of cells and that such reading is not dependent on the pointer having to revolve to keep in step with rapid movement of the slide of the machine tool as would be the case with a conventional counting system, for, as soon as the slide comes to rest at any part of its travel the pointer will take up a position showing the position of the fringe pattern. In other words, the system of this invention is a direct reading system as distinct from a counting system. For certain control applications where the derived signal is amplified and used to control a synchronous electric motor, the signal may be arranged to follow continuously all movements of the fringes, i.e. the machine slide. A corresponding system of lamps, photo cells, and gratings or other and possibly simpler methods of modulating the light from each lamp may be provided for measuring from 0 to one-hundredth of an inch although this may possibly be effected in other and simpler ways, for example by mechanical means which could also be used for indicating the movement of the slide in units of one inch. By the apparatus of this invention, therefore, the position of a slide may be indicated by means of, say, three dials which will read in units of one inch, one-hundredth of an inch, and one ten-thousandth of an inch.

It will be appreciated that some lamps produce light fluctuating at a frequency double that of the supply by which they are energised, and to ensure that the reference signal applied to the receiver has the same frequency as the derived signal, a frequency doubler 17 may be included between the supply 15 and the receiver 16.

An important advantage of the pattern of cells illustrated in FIGURE 1 and when using fringes extending diagonally over the pattern is that since the outputs from the three cells in each row are combined, they may be replaced by one long cell or by a small cell on which light passing through the respective slit in mask 10 is concentrated by a suitable lens. An example of such an arrangement will be described below with reference to FIGURES 12 to 15.

It is, however, not necessary that the cells are arranged in the pattern of FIGURE 1 and many alternative arrangements are possible.

FIGURES 3 to 8 show some possible alternatives. In each case the photo cells are indicated by the letters $a$, $b$ and $c$ and the outputs from cells denoted by the same letter are combined vectorially to produce one phase of an output signal, while the three rectangles enclosing groups of cells show the cells which are illuminated by light of the same phase, the rectangles corresponding to the slits 4, 5 and 6 in the mask 7 of FIGURE 1 which are illuminated by separate lamps. FIGURE 3 corresponds to the arrangement of FIGURE 1 but with the pattern of cells and the slits turned through 90°. FIGURES 4 to 7 show various possible arrangements wherein the vernier type fringes extend at right angles to the direction of movement of the index grating which in each case is assumed to be towards the right-hand side of the drawing, the reference grating being fixed. In these examples also the rulings of the two gratings are parallel so that the fringes appear to move in the same direction as the index grating or in the opposite direction depending on whether the number of lines per unit length of one grating is slightly more or slightly less than that of the other grating. The arrangement of FIGURE 7 may be convenient where magnetic rather than optical gratings are used, the letters $a$, $b$ and $c$ in this case representing magnetic polarity sensing devices such as flux gates. An embodiment of the invention using magnetic methods is described below. FIGURE 8 differs from the previously described arrangements in that instead of using vernier gratings it uses gratings having exactly equal line spacings and which are crossed at a small angle to produce a moiré type fringe pattern. By crossing the gratings the fringes can be made to extend in the direction of movement of the index grating and move at right angles to such direction.

In arrangements involving gratings which are slightly inclined to one another, as for example the arrangements of FIGURES 1, 3 and 8, it may be convenient to arrange that the grating which is movable is positioned with its ruling strictly at right angles to the direction of movement since this will prevent lateral movement of the grating causing unwanted movement of the fringe patterns and possible inaccuracy in indication. In such an arrangement the reference grating may be slightly inclined to the direction of movement of the movable grating and this may be made use of in cases, such as machine tools where this grating is relatively long, to provide compensation for variation in length of the grating with temperature. Such compensation may be effected by providing a temperature sensitive device which acts to alter the inclination of the grating and thus its effective length in terms of the direction of movement.

Where the movable grating is slightly inclined relative to the fixed grating, it is important to design the system in such manner that the movable grating slides linearly and exactly parallel to the length of the fixed grating in guides fixed in relation to the fixed grating rather than being held strictly parallel to the direction of movement of the moving member or slide of the machine in which the measuring device is installed.

In arrangements where the highest accuracy is required it is desirable to provide means for compensating for irregularities in the relative movement of the two gratings owing to the high magnification which occurs of such irregularities as revealed by the movements of the fringe patterns.

For example, small deviations from the correct angle of inclination between reference and index gratings in the vernier type of diagonal fringe pattern, as shown in FIGURES 1 and 3, cause large deviations in the diagonal fringe angle. Similarly, small deviations from the correct angle of inclination in the case of crossed gratings (FIG. 8) produces a magnified deviation in fringe pitch. In either of these cases, the errors can be annuled by duplicating the system of illuminated areas and photo cells and arranging that in one system the errors act to oppose like errors in the other system. For example, as illustrated diagrammatically in FIGURE 9, two sets of fringes 20 and 21 inclined at 45° to the direction of movement of the index grating but on opposite diagonals, that is at right angles to one another, may be applied to two separate sets of lamps, lenses and photo cells reading from a common reference grating, the layout of the photo cells being as shown in FIGURE 3 but with one set reversed from left to right with respect to the other. In one set, the index grating is inclined slightly clockwise, and in the other slightly anticlockwise to produce the opposite diagonal directions of fringes. The index gratings can be ruled at the appropriate oppositely inclined angles on the one glass or other transparent plate, but in the preferred arrangement the simpler method of using two identically ruled plates set independently at the required opposite inclinations on a common index slide is used. The two sets, for convenience and economy of space, are mounted side by side. Alternatively, only one set of lamps may, by an optical beam-splitting arrangement, be used to illuminate both fringe systems, and similarly by optical means both systems may be applied to one set of photo cells.

The action of this arrangement is as follows: If the common index slide is turned out of position slightly in one direction, say clockwise, both diagonal fringe patterns will also turn clockwise to the above mentioned magnified extent and to positions 20' and 21'. The effect of such departure from the chosen angle of 45° for the fringe bands will, in the layout of cells shown in FIGURE 3, cause the bands to decrease their pitch in one fringe system 20 along a co-ordinate parallel to the direction of movement of the index grating, while their pitch along a co-ordinate at right angles to this movement remains constant. With fringe pattern 21, however, the departure from the angle 45° will cause the bands to increase their pitch along the co-ordinate parallel to the direction of movement.

These changes will alter the proportion of light energy received by any one group of cells, aaa, bbb, etc. from any one phase of illumination as compared with that received from either of the other two phases, in a manner depending upon the positions for the time being of the light and dark bands in the rectangles of illumination, and these differences can be paired in opposition by taking one from each set of fringes 20 and 21 and opposing it to its complementary pair from the other set.

The invention as thus far described has been explained for convenience in terms of a three-phase system. It is, however, to be understood that the operation of the system of this invention does not depend on the use of three phases and that any number of phases from two upwards may be used for the supply and one upwards for the output signals from the photo cells or other sensing devices.

As an example reference may be made to an important modification of the system of this invention in which a single phase output is obtained from the photo cells. Considering the arrangement described with reference to FIGURE 1, it will be appreciated that the output from each group of cells $a$, $b$ or $c$ will be a single phase signal which will change its phase relationship with the reference supply as the fringe pattern moves in exactly the same manner and by the same angle as the output from the three-phase transformer 14.

It is therefore possible to omit, say, the cells $b$ and $c$ and the transformer 14 and also as above described to combine the three cells $a'$, $a''$ and $a'''$ in a single cell. The single phase sginal is preferably converted into a three-phase signal by means of a suitable three-phase converter for application to the instrument 16. Apart from the saving in cost and weight of equipment, the arrangement has the advantage that it is not affected by mutual variations in amplitude between phases due to changes in a multiplicity of amplifiers or components, or in photo cells, since any changes occurring in the single phase signal must affect equally all phases in the polyphase output from the converter.

In a variation of this arrangement substantially complete compensation for changes in characteristics of the lamps can be obtained in addition to the above-mentioned advantages. Referring to FIGURE 10 which again shows for the purpose of explanation only a three-phase system, the outputs from the three photo cells $a$, $b$ and $c$ which are illuminated by respective lamps, not shown, energized from the separate phases of a three-phase supply, are separately amplified in amplifiers 24, the outputs from which are applied to a three-phase/single-phase converter 25. The single phase output from the converter is amplified by amplifier 26 and the amplified signal applied to a second converter 27 which supplies a three-phase signal to the instrument 28. This instrument is also energised from the three-phase supply to the lamps. If desired, the output of the amplifier 26 may include a circuit 29 tuned to the fundamental frequency whereby the effects of harmonics may be minimised.

In this arrangement it will be seen that the action of the first converter 25 is to rotate the phase signal vector from each photo cell by the required angle of 120° for combining additively the polyphase signals into a common single phase signal. Thus a change in phase angle between the single phase output from the first converter and one phase of the polyphase signal is balanced out by opposite changes in phase angle between the single phase output signal and the other phases of the polyphase signal. The amplitude of the combined single phase output from the first converter is of course affected to some extent but this can be kept within reasonable limits even for very large changes in light output from one or more lamps by limiting and/or gain control in the amplifier or amplifiers, and in any case, as explained above, such variations in amplitude affect all phases of the polyphase output from the second converter 27 alike and therefore do not affect the accuracy of indication obtained from the measurement indicator 28.

Accordingly any change in brightness of one lamp will not affect the angle of phase rotation produced by a given movement of the fringes and even total extinction of a lamp will not produce serious error in the reading of measurement.

The polyphase illuminating system used in the forms of the invention described above may be dispensed with if desired. The same result may be obtained, for example, by using a chopped source of steady light derived by interposing between a single lamp and the gratings a transparent cylinder or disc, which is synchronously driven by a small motor running from a single phase A.C. supply, which may be used as the reference signal, and which has sinusoidally graduated opaque and transparent bands printed on it by any suitable means, such as photographically. This methd has an advantage in eliminating errors due to differences in light intensity at different phases which can arise when using a different lamp for each phase. The graduations would be arranged to cast shadows in rotational order across the slits in turn to simulate illumination from a multiplicity, in this case three, of lamps energised by different phases of a polyphase supply as described above.

It will be appreciated from the foregoing that the system of this invention translates the movement of a fringe pattern, produced by relative movement between two gratings, into a phase modulated electric signal rather than an amplitude modulated signal as in certain known systems.

The use of phase modulated signals in the manner of this invention offers many advantages some of which will now be described.

It will be appreciated that the movements of the fringe pattern modulate the light derived from each phase lamp sinusoidally, and, provided that the quantity of light thrown on each cell from each phase lamp on passing through equally dark portions of the fringe pattern are arranged to be of equal intensity, each phase of the vectorially combined signals will maintain constant amplitude for any position of the fringes and for any changes in phase. They will also be substantially free from distortion or harmonics.

Another advantage of the method of reading without changes of amplitude is that at all stages in the transmission of the signals from any single photo cell or group of photo cells, the amplifiers or components or other equipment are carrying a constant load. As the equipment is constantly loaded there can be no distortion in phasing of the fundamental signal due to non-linearity in transmission or amplification characteristics. Thus amplifiers etc. can be of simple design and fully loaded.

In most embodiments of this invention means are provided for obtaining the above-mentioned equal intensities by using collimating lenses to keep the light beams substantially parallel where they pass through the gratings, by masking and/or by adjusting the voltages applied to the lamps and/or adjusting the output currents from the photo cells. Masking is done by interposing between the lamps and/or the photo cells and the gratings an opaque screen pierced with holes to admit to or from the gratings and positioned so that they cover the working areas of the fringe pattern and adjusted in size so that equal amounts of light fall on these areas. The mask or masks provide a pre-fixed means of balancing the elements of illumination, while the adjustment of the lamp voltages and photo cell output currents by simple electrical means, such as the use of variable resistors, potentiometers, etc. serves for fine adjustment. By this means, harmonics and distortion can be completely balanced out as the overall response of each cell from each lamp in turn can be checked and accurately balanced. By these means also any deleterious effects on the photo cell response, of any ambient light or internal reflections in the apparatus, can also be balanced out.

Another advantage is that changes in the amplitude of one phase signal in relation to others, as may arise due to having to change an amplifier valve or transistor or photo cell or other component or to differences in ageing or temperature characteristics between one component and another, can be avoided by limiting and/or automatic gain control or negative feedback in the amplifiers.

Another advantage is that transformers and other equipment can be fully loaded or even overloaded without loss of phase relationship between phases at fundamental frequency, that is to say without loss of accuracy in indication of measurements, thus rendering it possible to reduce the size of equipment considerably and help to miniaturise the electrical parts of the apparatus.

Another advantage of the phase modulation is that maintenance of the apparatus is rendered simpler and accuracy easier to maintain because, with the signal being independent of amplitude for the accuracy of the information which it carries, any influences affecting amplitude, such as may occur due to voltage fluctuations in the supplies to the amplifiers, etc., changes in transistor or photo cell performance due to changes in temperature, replacement or ageing, etc., can be eliminated by limiting in the amplifier stages. In practice fairly wide changes in signal amplitude, i.e. power delivered to the receiver, can be tolerated so long as they fall within the range of sensitivity of the receiver or indicator and normal replacements of worn components will not involve adjustments to preserve accuracy.

Precisely similar principles as those for optical gratings are applicable in the case of gratings made on a magnetic base in the form of magnetic tape or steel strip or wire. Such gratings consist of parallel zones magnetised alternately with N and S poles arranged across the base material such that the polarity alternates in the direction of relative movement between the two gratings.

The magnetised zones take the form of narrow zones of alternate polarity which, in the case of tape or strip, are in the form of transverse lines across the width of the tape or strip, or, in the case of wire, take the form of discs or sections packed close together and magnetised so that adjacent poles have the same polarity. The reference grating is magnetised at accurately regulated intervals, as in the case of the optical gratings, corresponding to a convenient fraction of the units in which measurements will be expressed, as for example 100 N poles per inch interspersed with 100 S poles per inch. Any other interval can be used without affecting the principles of operation. The index grating is similarly magnetised at regular intervals such that a vernier effect is obtained when the two gratings are used in conjunction, that is to say, for example if the interference pattern of magnetic poles having an interval of one per inch is required for the reading head, the index grating intervals of polarity would be either 101 N poles and 101 S poles per inch, or 99 N poles and 99 S poles per inch.

The effect of arranging these two gratings in close proximity will be to produce interference zones of increased magnetic field alternating with zones of decreased magnetic field according to whether the zone is located in a region where the N and S poles of the two gratings aid one another or oppose.

In a typical arrangement using magnetic gratings the reference grating may be a plastic magnetic tape such as that used in magnetic recorders, and the index grating may be a similarly magnetised thin plate of suitable steel. The tape forming the reference grating is movable and the index grating is fixed and slightly inclined in such a way as to produce a diagonally inclined magnetic interference pattern. Close to the superposed gratings is arranged a set of nine magnetic heads of the flux gate type arranged in a square such that the interference bands are parallel to a diagonal of the square and, as they move due to movement of the reference grating, pass successively across the diagonal of the square.

One form of a suitable magnetic head is shown in FIGURE 11. As shown, the head comprises two limbs 37 and 39 of ferro-magnetic material are joined at one end by a yoke and which, at their other ends, are spaced apart by a gap 34. This gap may be an air gap or may be constituted by a space filled with a non-magnetic or diamagnetic material. In use, the head is arranged with the gap located closely adjacent one of the gratings and aligned with the diagonal of the square which lies parallel to a fringe. Intermediate their ends the limbs are joined by a bridge member 35 preferably made of a ferro-magnetic material having a rectangular hysteresis loop. The head carries a primary winding 36 arranged on limb 37 and a secondary winding 38 arranged on limb 39, and there is also provided a further winding 40 on the yoke which is energised from an adjustable source of direct current 41 in such manner that the flux in the bridge 35 approaches saturation. If desired, a further winding connected with the source 41 may be arranged on the bridge 35 and energised in such manner as to prevent too great a flux density occurring across the gap 34.

An alternating current forming one phase of a reference signal is applied to the primary winding 36 so that, superimposed on the steady magnetic field in the nearly saturated bridge 35, is a weak alternating field which produces a fluctuating flux linking the secondary winding 38 and induces in it an alternating E.M.F. in synchronism. The effective coupling and the strength of the E.M.F. induced in the secondary winding 38 depends upon the effective permeability of the magnetic circuit of the device which acts as a transformer.

Changes in the magnetic field across the gap 34 due to changes in position of the interference pattern of magnetism derived from the two gratings, changes the degree of saturation of the circuit of the transformer and hence alters the E.M.F. induced in the secondary winding.

As in the case of the optical arrangement shown in FIGURE 1, the sensing elements (which in this case are magnetic heads instead of photo cells) are interconnected so that those which are responding to any one phase of the reference signal give a combined output. The manner in which this is arranged is as follows: The nine magnetic heads are arranged in three columns of three in each column, corresponding to three rows of three in each row. The primary windings of all the magnetic heads in one column are connected to one phase of a three-phase source, those of the second column are connected to the next phase of the source, and those of the third column to the third phase. The secondary windings of the three heads of each row are interconnected and each row provides one phase of a three-phase output signal which, after amplification, is applied to a phase meter or synchro type receiver for comparison with the reference signal.

The arrangement is thus essentially the same as that already described in connection with an optical system and need not be explained further.

In order that the application of the system of this invention may be clearly understood, some forms of instrument incorporating the invention will now be described in more detail.

Referring first to FIGURES 12 to 15, there is shown a height gauge of conventional construction but modified to incorporate the invention. As shown, the instrument comprises a base 51 which carries a screwed column 52 on which is slidably mounted a stiff frame 53 in which there is a rectangular slide 54 carrying a probe 55 freely slidable between two vertical guides 56 on ball bearings 57.

The slide 54 has a window in which is fixed a glass scale 58. This moves vertically with the slide 54 in a plane parallel to a fixed index glass 59 and is ruled by photographic means throughout its length on one half of one face with a reference grating 60 of 100 straight horizontal lines per inch. The lines are opaque to light and are of the same width as the spaces between them, that is a 1:1 line/space ratio. This grating faces a similar index grating 61 ruled horizontally in the same way with 101⅓ straight lines per inch, also with a line/space ratio of 1:1 on half of the face of index glass 59 opposite to and nearest the reference grating 60. The other half of the same face of the glass scale 58 has coded scales 62 of a known binary type photographically printed on it, and, in conjunction with a fixed graticule 63, forms the signal generating element of a numerical digitiser.

Three neon lamps 64 energised each with a different phase of a three-phase fifty cycle electrical supply are arranged in a horizontal row with their axes spaced ¼" apart and positioned to transmit light through a triple lens 65a, the reference grating 60, and the index grating 61, and another similar triple lens 65b to illuminate three photo cells 66 arranged in a vertical column with their axes ¼" apart. Each triple lens 65a and 65b consists of three simple identical plano-convex lenses cut each to a rectangular shape symmetrically about its optical axis to a size closely approximating ¾" by ¼" rectangle and cemented together on their plane faces to a cover glass, the whole forming a square triple lens with sides ¾" by ¾", and having three parallel optical axes spaced ¼" apart. To reduce the effects of internal reflections in the combination of the three lenses and to correct for small errors in the alignment of the three optical axes of either of the two triple lenses in their final position in the instrument, there may be a mask 67 pierced with three rows of three similar holes which is placed between the triple lens 65a nearest the lamps 64 and the glass scale 58.

The reference grating 60 moves in a plane close to the plane of the index grating 61. Due to interference of the light passing from lamps 64 through the two gratings 60 and 61 a known pattern of interference fringes is produced in the form of straight bands of light and shade which modify the illumination of the photo cells 66. The fringes have a predetermined vertical pitch of ¾" which corresponds to three times the axial spacing of the photo cells and, by setting the index grating 61 at a slight angle with the reference grating 60, the fringes are arranged to be inclined at an angle of 45° so that they also have a horizontal pitch of ¾", to correspond with the horizontal axial spacing of the lamps 64.

The lamps 64, the lenses 65, the mask 67, and the photo cells 66 are so positioned that the axis of the centre lamp 64b, the central of the three axes of lens 65a, the centre of the central hole in the mask 67, the central of the three optical axes of triple lens 65b, and the axis of the central photo cell 66 are all in the same line perpendicular to the planes of the gratings 60 and 61 and substantially in the middle of the pattern of fringes. Thus the axes of the three lamps 64 and the three optical axes of the triple lens 65a are coincident with and in the same horizontal plane, and the axes of the three photo cells 66 are coincident with and in the same vertical plane as the optical axes of triple lens 65b. Each lamp 64 is distanced from triple lens 65a so that the centre of the illuminated space inside it is situated substantially at the focal point of the lens element in line with its axis, thus producing a collimated rectangular beam of light which passes through the gratings 60 and 61 and enters the triple lens 65b. Similarly the photo cells 66 are individually positioned with the centres of their light sensitive elements at the focal points of the three lens element of triple lens 65b.

Thus the light from each lamp 64, which traverses its respective element of lens 65a is divided by the three elements of lens 65b into three beams which converge on to the three photo cells 66. To reduce stray illumination, each triple lens may be fitted into the end of a close fitting square tube 73, blackened on the inside, and extending parallel to the central axis of the system. Thus the fringe pattern is limited to that portion which lies within the square area covered by the triple lenses 65*a* and 65*b*, and this area is now optically divided into nine square sections having ¼″ sides arranged symmetrically in three rows of three which are more or less obscured diagonally by the opaque bands in the fringe pattern.

Vertical movement of slide 54 will move grating 60 vertically and produce a magnified vertical movement of the fringes and, as known, any continued movement of the grating 60 will cause the clear and opaque fringe lines to pass vertically across the space between the lenses in cyclic order, each cycle corresponding to a movement of one hundredth of an inch of the slide 54. When the slide is stationary, the fringes will remain stationary in the field of the two lenses 65 in a position dependent upon the relative vertical position of the two gratings 60 and 61. Whatever position the fringes are in, the total amount of light falling on one photo cell element will remain the same, because this is collected by the particular lens element in line with its axis, the length of the lens element corresponding to the pitch of the fringe pattern in the direction of its length, that is horizontally, and because the light from the lamps 64 is evenly collimated over the area subtended by the lens element.

Owing to small differences in the distance between any one lamp 64 and different portions of the lens element which is collimating the light from that lamp, there will be differences in the total amount of light falling on one photo cell 66 as compared with another photo cell. These differences may be largely nullified by small modifications in the size of the holes in a vertical column in the mask 67 so that the amount of light passing through that column is the same as that passing through either of the other two columns. Normally the holes in the centre column of holes would be made slightly smaller than the holes in either of the outside columns. Similarly the amount of light focused on to any one photo cell by its corresponding lens element will tend to be slightly greater from the middle of the element than from the sides of the element. This can also be corrected by making the holes in the centre horizontal rows of holes in the mask 67 slightly smaller than the holes in the upper or lower horizontal rows. Thus the smallest hole in mask 67 would tend to be the centre one and the largest the ones at the corners of the system of nine holes.

Alternatively, or as a means for finer adjustment on each instrument on assembly, the intensity of light given out by each lamp 64 can be regulated by simple electrical means, and the response from each photo cell 66 can be equalised by simple electrical means.

In the same manner, any other differences in photo cell illumination found in practice due to reflections from the sides of the square tubes or other parts of the apparatus or other causes can be balanced out.

Now, considering the amount of light falling on one photo cell 66, the contribution received from the three lamps 64 will differ between one lamp and another depending on the position of the opaque portions of the fringe pattern. If one lamp 64*a* is obscured to the maximum extent of variation between different parts of the fringe pattern, due to an opaque band falling exactly diagonally across the ¼″ square element of lens field which connects that photo cell with lamp 64*a*, then the rest of the light picked up by the photo cell will come equally from the other two, and will be greater from each of them than that from the lamp 64*a* which is partially obscured.

If the opaque band is moved slightly away from this position, there will be an increase of light from lamp 64*a*, also an increase of light from one of the other lamps, say for the sake of illustration lamp 64*c* and, as the total quantity of light on the photo cell must remain constant, there will be an appropriate reduction of light from the third photo cell 64*b*.

If the fringes are moved continuously, there will be a cyclical sine law variation in quantity of light falling on any one cell from each lamp 64 in turn according to the direction in which the bands are passing in relation to the order in which the three lamps 64 are positioned. As the amount of photo cell response derived from each lamp will have been balanced up on the average, these sine law cyclical variations of light intensity will follow exactly the linear movement of the fringes, and the peaks in the sine curve of light intensity vs. linear movement will be of equal amplitude for all three light sources.

Thus the system provides a method of dividing up optically the ¾″ square area of fringe pattern scanned by the lamps 64 and the photo cells 66 into nine equal ¼″ squares, using only three lamps and three photo cells instead of the alternative method described with reference to FIGURE 1 of using nine cells. By energising the lamps with the three phases of a balanced three-phase A.C. supply, that is to say with phases having equal R.M.S. voltage and vectorially spaced mutually at 120°, a balanced three-phase output is obtained from the three photo cells.

As explained in an earlier part of this specification, the phase relationship between the three-phase output from the photo cells 66 and the three-phase input to the lamps 64 will depend on the position of the fringes and, as the slide 54 is moved over each successive distance of one-hundredth of an inch with consequent movement of the fringe pattern vertically over each successive ¾″, the phase relationship between the three-phase output from the photo cells and the three-phase input to the lamps will rotate vectorially through one complete revolution, i.e. 360°.

This phase rotation is indicated by a receiver as previously described in which there is a relative movement of 360° between a scale and pointer. By dividing the scale into one hundred divisions, the position of the lines in the reference grating 60 in relation to those of the index grating 61, which is fixed, is resolved to an accuracy corresponding to one-hundredth of the interval between successive lines in the reference grating 60. As this interval in this instrument is selected to be one-hundredth of an inch, each division on the receiver scale will indicate, against the pointer, movements of the slide 54 corresponding to one ten-thousandth of an inch. By estimating to a fraction of a division the position indicated by the pointer against the receiver scale, fractions of one ten-thousandth of an inch can be estimated, and the probe 55 thereby used to measure heights above any convenient reference level in increments of one-hundredth of an inch to an accuracy of a fraction of on ten-thousandth of an inch.

In an alternate arrangement of this instrument, only one photo cell 66 is used, preferably in the centre position of the three shown in FIGURE 15 and as described previously the single-phase output of this cell if necessary after amplification is converted to three phase by means of a converter.

This method of using only one photo cell (and one amplifier) has in addition to substantial saving in cost of cells and amplifiers, the great advantage that variations in output from the photo cell or the amplifier from any cause, such as ageing of the photo cell or of the transistors in the amplifier, affect each of the three phases derived from the converter equally. The only effect as far as the receiver is concerned is that the amount of signal power fed into it from the amplifier may vary but there will be no variation in the relative amounts of signal power or in the 120° phase relationship between the three phases of the input signal. The accuracy of indication displayed by the receiver is unaffected by small variations of signal amplitude.

Where three photo cells 66 are used, with or without amplifiers, variations in the output signal of any one of the three phases fed to the receiver in relation to the signal from either of the other two photo cells will interfere with the accuracy of indication displayed by the receiver because the length of the rotating vector corresponding to that phase will change in relation to the lengths of the vectors corresponding to the other two phases derived from the other two photo cells 66 and their associated amplifiers. To overcome this, therefore, provision is made for amplitude limitation or automatic gain control in the three amplifiers in order to ensure that the signal output from each phase is substantially constant.

Having described the methods by which movements of the slide 54 and probe 55 are measured in fractions of one line interval, i.e. fractions of one-hundredth of an inch, it remains to describe the means by which the coarser movements corresponding to whole hundredths, tenths of an inch, inches, etc., are detected and conveniently displayed. This is effected by using a pair of coded scales 62 photographically produced on the same glass plate 58 as the reference grating 60 in conjunction with a fixed graticule 63, a light source 68, and a set of photo cells 70 to form a linear digitiser with a numerical read-out. Since the construction and operation of such a device is well known, it will not be described herein.

In the modification of the instrument shown in FIGURES 16 to 18, the rulings of the reference grating 60 extend across the full width of the glassplate 58 held in frame 54, while the index grating comprises two separate gratings 73a and 73b which are arranged as described with reference to FIGURE 9. The required lamps, photo cells and ancillary equipment are arranged in a manner similar to that of the instrument of FIGURES 12 to 15 and the arrangement again operates to measure fractions of one-hundredth of an inch. In this case, however, different means are provided to indicate the coarser movements.

Figure 17:
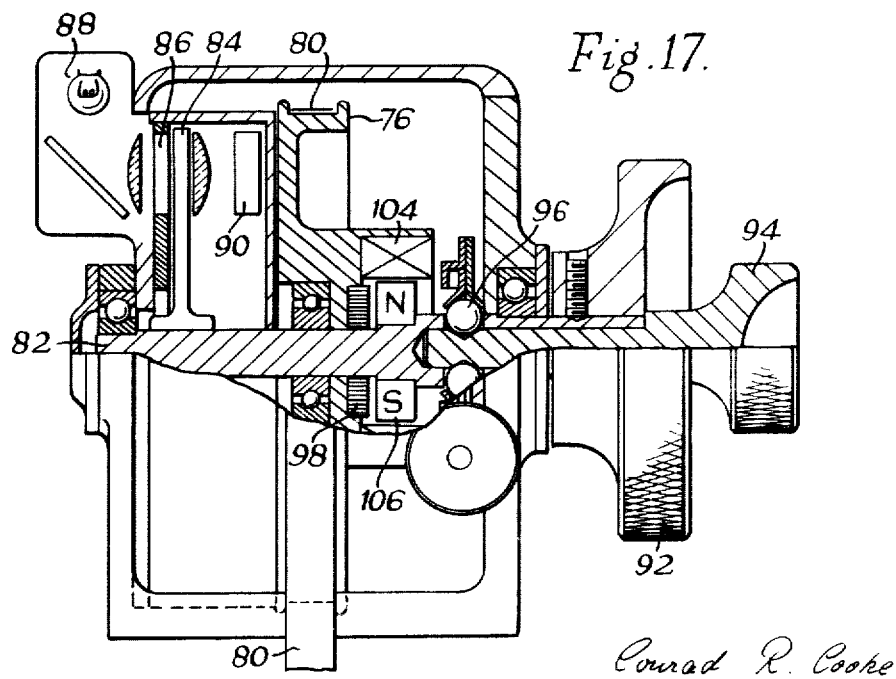

In both the instruments of FIGURES 12 to 15 and FIGURES 16 to 18, the frame 54 is suspended on a steel tape which passes over a pulley 76 and is attached to a counterweight 78. In the instrument of FIGURES 16 to 18, the pulley 76 is carried on a shaft 82. A disc 84 carrying suitable scales, e.g. binary coded scales, is secured on shaft 82 and moves relative to a graticule 86 so as to interrupt passage of light between a lamp 88 and photo cells 90. Such arrangement is also a well-known form of digitiser and need not be described further herein.

Rotation of the shaft 82 in order to move the frame 54 to bring the probe 55 into contact with a specimen to be measured is effected by knob 92 which is directly connected with shaft 82 or by means of knob 94 which drives shaft 82 through a known form of epicyclic reduction gear 96. A feature of this arrangement is that pulley 76 is not fast with shaft 82 but is coupled therewith through a spiral spring 98. Accordingly, when shaft 82 is turned to bring probe 55 into contact with a specimen to be measured, pulley 76 will cease to rotate and further rotation of shaft 82 will cause the spring to be tensioned and the pressure of probe 55 on the specimen to increase. The degree of pressure is indicated by means of a pointer 100 on a dial 102 (FIG. 16) and the pointer is driven by a synchro receiver which is energised by a synchro transmitter comprising rotor 104 fast with the pulley 76 and stator 106 fast with shaft 82.

FIGURE 19 shows in block diagram form the electrical equipment of the two instruments. It comprises a voltage stabiliser 110 which receives power from a single phase source and provides a stabilised supply to a rectifier 111 supplying D.C. to the amplifiers 112 for the output from the photo cells 113, to the digitiser 114 and the amplifier and relays 115 thereof, to the synchro transmitter 116, and to a converter 117 which provides a three-phase supply to the lamps 118 and to a frequency doubler 119 supplying the receiver 120. This figure also indicates a connection between the receiver 120 and the amplifier and relay system 115 of the digitiser which operates in known manner to prevent ambiguity occurring in the numerical display when any numeral changes from 9 to 0. For this purpose the rotor of the receiver may be arranged to supply a signal to the relay system as its pointer passes through the zero position. It may also be convenient to arrange that the pointer of the receiver moves through 180° for each hundredth of an inch, in which case the pointer may be duplicated and the two halves of the scale marked in red and black respectively so that the odd numbers of hundredths of an inch are indicated on one colour scale and the even numbers of hundredths of an inch are indicated on the other colour scale.

It will be appreciated that the numerical display and most of the electrical and electronic equipment may be housed in a cabinet which is connected with the instrument by means of a cable.

FIGURES 20 and 21 illustrate the application of the invention to a dividing head. As shown, a table 130 is mounted for rotation on a base member 131, the outer periphery of the table being supported relative to the base by means of ball bearings 132. The table has a downwardly depending flange 133 which on its inner face carries a reference grating 134 conveniently formed by a suitably ruled steel tape. An index grating mounted closely adjacent the reference grating 134 is formed on the curved outer face of a glass plate 135. Light from three lamps 138 passing through respective slits 139 and collimating lenses 140 illuminate the index grating and reference grating 134, while light reflected from the reference grating passes through respective lenses 141 and is focused on three photo cells 142, light transmissions over the required paths being conveniently effected with the aid of a form of prism 143. The manner in which the photo cells, gratings and lamps co-operate to provide the desired signal when relative movement of the gratings occurs is exactly the same as that previously described with reference to FIGURES 12 to 15 and will not be described again. The arrangement illustrates the use of a reflecting grating instead of a transmitting grating and it will be appreciated that in certain circumstances it might be convenient to use two reflecting gratings.

While the invention has been described mainly in connection with arrangements in which measurement of a position or movement is indicated, it is to be understood that the system of this invention is also applicable where it is desired to effect some control operation when a movement occurs.

Accordingly, in some cases the receiver or indicating instrument may be replaced by a three-phase motor of some suitable kind which will be effective to perform some mechanical operation. Likewise the movement of the receiver or indicating instrument could be applied to operate some convenient form of digitiser whereby pulse signals in coded form are provided by means of which some control operation could be effected or a punched tape produced.

I claim:

1. Apparatus for detecting the extent of relative movement between two relatively movable members, comprising: a polyphase alternating current source providing a reference signal; a plurality of signal producing means equal in number to the number of phases each for producing periodic signals; means for combining said periodic signals; phase displacing means coupled to said signal producing means for displacing the phase of said combined periodic signals relative to said reference signal by an amount proportional to the extent of any relative movement between the two relatively movable members, said phase displacing means including a first grating mounted in fixed relation to the one movable member and a second grating mounted in fixed relation to the other said member, said gratings being superimposed in close proximity for producing a pattern of interference fringes, said signal producing means being positioned so as to receive and respond to the fringe pattern; and receiver means arranged to respond to any phase difference between said reference and said combined periodic signals.

2. Apparatus for detecting the extent of relative movement between two relatively movable members, comprising: a polyphase alternating current source for providing a reference signal; signal producing means equal in number to the number of phases each producing a periodic signals; means for combining said periodic signals; phase displacing means coupled to said signal producing means for displacing the phase of said combined periodic signals relative to said polyphase reference signal by an amount proportional to the extent of any relative movement between the two relatively movable members, said phase displacing means including a first grating mounted in fixed relation to the one movable member and a second grating mounted in fixed relation to the other said member, said gratings being superimposed in close proximity for producing a pattern of interference fringes, said signal producing means being positioned so as to receive and respond to the fringe pattern; and receiver means responsive to any phase difference between said polyphase reference signal and said combined periodic signals for producing mechanical movement dependent thereon, said receiver means comprising a dynamo-electric machine having a rotor and a stator each carrying a respective winding, means coupled to said alternating current source producing means for applying said reference signal to one said winding, and means coupled to said signal producing means for applying said combined periodic signals to the other winding.

3. Apparatus according to claim 2, wherein the receiver means include a rotary index driven by said rotor, and a fixed graduated scale cooperating with said index.

4. Apparatus according to claim 2, and further including a digitiser to which the rotor is coupled for producing coded signals in accordance with such mechanical movement.

5. Apparatus for detecting the extent of relative movement between two relatively movable members, comprising: a polyphase alternating current source for providing a reference signal; signal producing means equal in number to the number of phases each producing a periodic signal; means for combining said periodic signals; phase displacing means coupled to said signal producing means for displacing the phase of said combined periodic signals relative to said reference signal by an amount proportional to the extent of any relative movement between the two relatively movable members, said phase displacing means including a reference grating mounted in fixed relation to the one movable member and a Vernier grating mounted in fixed relation to the other said member, said gratings being superimposed in close proximity, and said gratings being relatively inclined for producing a fringe pattern which is inclined to the direction of relative movement of the gratings, said signal producing means being positioned so as to respond to the fringe pattern; and receiver means coupled to said alternating current source and to said signal producing means and responsive to any phase difference between said reference signal and said combined periodic signals.

6. Apparatus for detecting the extent of relative movement between two relatively movable members, comprising: a polyphase alternating current source for providing a reference signal; a plurality of signal producing means equal in number to the number of phases each producing a periodic signal; means for combining said periodic signals; phase displacing means coupled to said signal producing means for displacing the phase of said combined periodic signals relative to said reference signal by an amount proportional to the extent of any relative movement between the two relatively movable members, said phase displacing means including first and second crossed gratings having the same number of rulings per unit length, the first grating being mounted in fixed relation to the one relatively movable member, the second grating being mounted in fixed relation to the other said member, and said gratings being superimposed for producing a pattern of interference fringes; said signal producing means being positioned so as to respond to the fringe pattern; and receiver means coupled to said alternating current source and to said signal producing means and responsive to any phase difference between said reference signal and said combined periodic signals.

7. Apparatus for detecting the extent of relative movement between two relatively movable members comprising: a polyphase electric source; means coupled to said source for deriving a polyphase reference signal from said source; illuminating means coupled to said source and comprising at least two light sources energised by different phases of said electric source; photo-electric means comprising at least two photo-electric cells each disposed to receive light from each light source and to produce an output signal; phase displacing means for displacing the phase of said output signal relative to the reference signal, said phase displacing means including a first optical grating mounted in fixed relation to the one movable member and a second optical grating mounted in fixed relation to the other said member, said gratings being superimposed in close proximity between the illuminating means and the photo-electric means for producing a pattern of interference fringes at the photo-electric means; and receiver means coupled to said signal deriving means and to said photo-electric means and responsive to any phase difference between the reference signal and said output signal.

8. Apparatus for detecting the extent of relative movement between two relatively movable members comprising: a polyphase electric source; means coupled to said source for deriving a polyphase reference signal from said source; illuminating means comprising at least two light sources coupled to and energised by different phases of said electric source; photo-electric means comprising at least two photo-electric cells, each said cell being disposed to receive light from each said light source for producing an output signal; transformer means coupled to said cells for combining the output signals of said cells, the combined output signals constituting a polyphase output signal; phase displacing means for displacing the phase of said output signal reltaive to the reference signal, said phase displacing means including a first optical grating mounted in fixed relation to the one movable member and a second optical grating mounted in fixed relation to the other said member, said gratings being superimposed in cose proximity between the illuminating means and the photo-electric means for producing a pattern of interference fringes at the photo-electric means; and receiver means coupled to said signal deriving means and said transformer means and responsive to any phase difference between the reference signal and said output signal.

9. Apparatus for detecting the extent of relative movement between two relatively movable members comprising: a polyphase electric source; means coupled to said source for deriving a polyphase reference signal from said source; illuminating means comprising as many light sources as there are phases, each source being coupled to and energised by a different phase of said electric source; photo-electric means comprising a single photo-electric cell disposed to receive light from each light source and to produce a signal; phase displacing means for displacing the phase of said output signal relative to the reference signals, said phase displacing means including a first optical grating mounted in fixed relation to the one movable member and a second optical grating mounted in fixed relation to the other said member, said gratings being superimposed in close proximity between the illuminating means and the photo-electric means for producing a pattern of interference fringes at the photo-electric means; a single phase/polyphase converter coupled to said photo-electric cell for converting the single phase signal from said cell to a polyphase signal; and receiver means coupled to said signal deriving means and to said converter and responsive to any phase difference between the reference signal and said output signal.

10. Apparatus for detecting the extent of relative movement between two relatively movable members comprising: a polyphase electric source; means coupled to said source for deriving a polyphase reference signal from said source; illuminating means comprising at least two light sources coupled to and energised by different phases of said electric source; photo-electric means comprising at least two photo-electric cells, each said cell being disposed to receive light from each said light source for producing an output signal; phase-displacing means for displacing the phases of said output signals relative to the reference signal by an amount proportional to the extent of any relative movement between the two relatively movable members, said phase displacing means including a first optical grating mounted in fixed relation to the one relatively movable member and a second optical grating mounted in fixed relation to the other said member, said gratings being superimposed in close proximity between the illuminating means and the photo-electric means for producing a pattern of interference fringes at the photo-electric means; transformer means coupled to said photo-electric cells for combining the output signals of said cells, the combined output signals constituting a polyphase output signal; a polyphase/single phase converter coupled to said transformer for converting said polyphase output signal to a single phase signal; amplifying means coupled to said converter for amplifying said single phase signal; a single phase/polyphase converter coupled to said amplifying means for converting said amplified single phase signal to a polyphase signal; and receiver means coupled to said signal deriving means and to said last mentioned converter and responsive to any phase difference between the reference signal and said polyphase signal.

11. Apparatus for detecting the extent of relative movement between two relatively movable members comprising: an alternating current source; means coupled to said source for deriving a polyphase alternating current reference signal from said source; illuminating means comprising a plurality of light sources coupled to and energised by different phases of said source; photo-electric means comprising a plurality of photo-electric cells, each cell being disposed to receive light from and be responsive to light from said illuminating means, means coupled to said photo-electric cells for producing an output signal; phase displacing means for displacing the phase of said output signal relative to the reference signal, said phase displacing means including a reference grating mounted in fixed relation to the one movable member, a first Vernier grating mounted in fixed relation to the other member, and a second Vernier grating mounted in fixed relation to said other member, said Vernier gratings being disposed side by side, and in close proximity to said reference grating and positioned between the illuminating means and said photo-electric means, said Vernier gratings being inclined to said reference grating at predetermined equal and opposite angles for producing a fringe pattern which is inclined to the direction of relative movement of the gratings; and receiver means coupled to said signal deriving means and to said photo-electric means and responsive to any phase difference between the reference signal and said output signal.

12. Apparatus for detecting the extent of relative movement between two relatively movable members comprising: a polyphase electric source; means coupled to said source for deriving a polyphase reference signal from said source; illuminating means comprising a plurality of light sources coupled to and energised by different phases of said electric source; photo-electric means comprising a plurality of photo-electric cells, each cell being disposed to receive light from said light sources and producing an output signal, said photo-electric cells being disposed in a square array comprising equal numbers of rows and columns; a first mask positioned between said light sources and said photo-electric cells, said mask providing a plurality of slits each of which is aligned with a respective column of photo-electric cells; a second mask positioned between said first mask and said photo-electric cells, said second mask providing a plurality of slits each of which is aligned with a respective row of photo-electric cells; transformer means coupled to said photo-electric cells for combining the output signals from the photo-electric cells, the combined output signals constituting a polyphase output signal; phase displacing means for displacing the phase of said polyphase output signal relative to said reference signal by an amount proportional to the extent of any relative movement between the relatively movable members, said phase displacing means including a first optical grating mounted in fixed relation to the one movable member and a second optical grating mounted in fixed relation to the other said member, said gratings being superimposed in close proximity and between said first and second masks for producing a pattern of interference fringes at said photo-electric means; and receiver means coupled to said signal deriving means and to said transformer means and responsive to any phase difference between said polyphase output signal and said reference signal.

13. Apparatus for detecting the extent of relative movement between two relatively movable members comprising: a polyphase electric source; means coupled to said source for deriving a polyphase reference signal from said electric source; illuminating means comprising a plurality of light sources coupled to and energised by different phases of said electric source; photo-electric means comprising a plurality of photo-electric cells, each cell being disposed to receive light from the illuminating means and producing an output signal; said cells being arranged in groups; masking means disposed between said light sources and the photo-electric cells for ensuring that each group of cells receives light from one respective light source only; circuit means coupled to said photo-electric cells in each group for combining the output signals from one cell in each group, the combined output signals constituting a single phase output signal; transformer means coupled to said circuit means for combining said single phase output signals, the combined single phase output signals constituting a polyphase output signal; phase displacing means for displacing the phase of said polyphase output signal relative to the reference signal by an amount proportional to the extent of any relative movement between movable members; said phase displacing means including a first optical grating mounted in fixed relation to the one movable member and a second optical grating mounted in fixed relation to the other said member, said gratings being superimposed in close proximity between the illuminating means and the photo-electric means for producing a pattern of interference fringes at said photo-electric means, and receiver means coupled to said signal deriving means and to said transformer means and responsive to any phase difference between the polyphase output signal and the reference signal.

14. Apparatus according to claim 13, wherein the light sources are adapted to produce light fluctuating at a frequency double that of the electric source, and wherein said means for deriving the reference signal include a frequency doubler.

15. Apparatus for detecting the extent of relative movement between two relatively movable members comprising: a polyphase electric source; means coupled to said source for deriving a polyphase reference signal from said source; illuminating means comprising a plurality of light sources coupled to and energized by different phases of said electric source; a plurality of photo-electric means, each photo-electric means being disposed to receive light from a respective said light source and producing an output signal; amplifying means coupled to said photo-electric means for amplifying the respective output signals from said photo-electric means; circuit means coupled to said amplifier means and constituting a polyphase/single phase converter for converting said amplified output signals to one single phase output signal; further amplifying means coupled to said converter for amplifying said single phase output signal; circuit means constituting a single phase/polyphase converter coupled to said further amplifying means for converting the amplified single phase signal to a polyphase output signal; phase displacing means for displacing the phase of said polyphase output signal relative to the reference signal by an amount proportional to the extent of any relative movement between the relatively movable members, said phase displacing means including a first optical grating mounted in fixed relation to the one movable member and a second optical grating mounted in fixed relation to the other said member, said gratings being superimposed in close proximity between the illuminating means and the photo-electric means for producing a pattern of interference fringes at said photo-electric means; and receiver means responsive to a phase difference between said reference signal and further signal for producing mechanical movement dependent thereon, said receiver means comprising a dynamo-electric machine having a rotor and a stator each carrying a respective polyphase winding, means coupled to said signal deriving means for applying said reference signal to one said winding, and means coupled to said last mentioned converter for applying said further signal to the other winding.

16. Apparatus for detecting the extent of relative movement between two relatively movable members comprising: a polyphase electric source; means coupled to said source for deriving a polyphase reference signal from said source; a first magnetic grating mounted in fixed relation to the one movable member, and a second magnetic grating mounted in fixed relation to the other said member, each magnetic grating consisting of a magnetic base having a plurality of adjacent parallel magnetic zones of alternate polarities, each zone extending transversely to the direction of relative movement between the gratings, and said gratings being superimposed in close proximity for producing a pattern of magnetic interference fringes, the positions of the fringes being determined by the relative positions of the gratings; magnetic polarity sensing means for determining the positions of said fringes with respect to a fixed reference, said magnetic polarity sensing means comprising a plurality of flux gates each having an input winding and an output winding, and means responsive to magnetic field strength and polarity for controlling the outputs of the flux gates; circuit means connecting said input windings each to a different phase of the polyphase electric source; circuit means coupled to said output windings to derive respective output signals from said output windings; transformer means coupled to said circuit means for combining said output signals, the combined output signals constituting a polyphase output signal, said polyphase output signal being phase displaced relative to the reference signal by a phase angle proportional to the displacement of the fringes; and receiver means coupled to said signal deriving means and to said transformer means and responsive to any phase difference between the polyphase output signal and the reference signal.

References Cited by the Examiner

UNITED STATES PATENTS

| | | | |
|---|---|---|---|
| 2,832,259 | 4/1958 | Merton | 250—237 |
| 2,875,524 | 3/1959 | Bower et al. | 33—125 |
| 2,886,717 | 5/1959 | Williamson et al. | 250—237 |
| 2,916,826 | 12/1959 | Bower et al. | 88—14 X |
| 3,076,374 | 2/1963 | DeNeergaard | 88—14 |
| 3,096,441 | 7/1963 | Burkhardt | 250—209 |
| 3,099,090 | 7/1963 | Frisch | 88—14 |

RALPH G. NILSON, *Primary Examiner.*

WALTER STOLWEIN, *Examiner.*

M. A. LEAVITT, *Assistant Examiner.*